(12) United States Patent
Joshi et al.

(10) Patent No.: US 10,789,074 B2
(45) Date of Patent: *Sep. 29, 2020

(54) PROVIDING PRE-BOOT SERVICES IN AN INFORMATION HANDLING SYSTEM HAVING OPERATING SYSTEM-SPECIFIC HARDWARE AND/OR FIRMWARE COMPONENTS

(71) Applicant: Dell Products, L.P., Round Rock, TX (US)

(72) Inventors: Anand Prakash Joshi, Round Rock, TX (US); Christian L. Critz, Liberty Hill, TX (US); Alok Pant, Austin, TX (US); James T. Gillon, Round Rock, TX (US); Adolfo S. Montero, Pflugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 169 days.

This patent is subject to a terminal disclaimer.

(21) Appl. No.: 15/909,133

(22) Filed: Mar. 1, 2018

(65) Prior Publication Data

US 2019/0243660 A1 Aug. 8, 2019

Related U.S. Application Data

(60) Provisional application No. 62/627,100, filed on Feb. 6, 2018, provisional application No. 62/627,086, filed on Feb. 6, 2018.

(51) Int. Cl.
*G06F 15/177* (2006.01)
*G06F 9/4401* (2018.01)
*G06F 11/14* (2006.01)
*G06F 15/78* (2006.01)

(52) U.S. Cl.
CPC ............ *G06F 9/441* (2013.01); *G06F 9/4403* (2013.01); *G06F 9/4405* (2013.01); *G06F 11/1417* (2013.01); *G06F 15/7839* (2013.01); *G06F 9/4401* (2013.01); *G06F 9/4411* (2013.01)

(58) Field of Classification Search
CPC ...... G06F 9/4403; G06F 9/441; G06F 9/4405; G06F 15/7839; G06F 11/1417
USPC .......................................................... 713/2
See application file for complete search history.

(56) References Cited

U.S. PATENT DOCUMENTS

| | | | | |
|---|---|---|---|---|
| 6,763,458 B1* | 7/2004 | Watanabe | ............... | G06F 9/441 |
| | | | | 713/100 |
| 7,203,804 B2* | 4/2007 | Kawano | ............... | G06F 9/4406 |
| | | | | 711/156 |
| 9,779,248 B1* | 10/2017 | Gefflaut | ................ | G06F 21/575 |
| 2006/0184794 A1* | 8/2006 | Desselle | ............... | G06F 21/575 |
| | | | | 713/166 |

(Continued)

*Primary Examiner* — Volvick Derose
(74) *Attorney, Agent, or Firm* — Fogarty LLP

(57) ABSTRACT

Systems and methods for providing pre-boot services in an Information Handling System (IHS) having Operating System (OS)-specific hardware and/or firmware components. In some embodiments, an IHS may include an Embedded Controller (EC), a first Operating System (OS)-specific chip coupled to the EC, and a second OS-specific chip coupled to the EC, where the EC is configured to cause the IHS to: in a first mode of operation, perform a first boot procedure using the first OS-specific chip; and in a second mode of operation, perform a second boot procedure using the second OS-specific chip.

18 Claims, 4 Drawing Sheets

(56) References Cited

U.S. PATENT DOCUMENTS

| | | | | |
|---|---|---|---|---|
| 2006/0212729 A1* | 9/2006 | Kondo | G06F 9/441 | 713/300 |
| 2006/0294357 A1* | 12/2006 | Choo | G06F 9/441 | 713/2 |
| 2007/0055860 A1* | 3/2007 | Wang | G06F 1/3203 | 713/2 |
| 2007/0074223 A1* | 3/2007 | Lescouet | G06F 9/4555 | 718/108 |
| 2008/0162914 A1* | 7/2008 | Adrangi | G06F 9/441 | 713/2 |
| 2008/0168310 A1* | 7/2008 | Saretto | G06F 11/2284 | 714/30 |
| 2009/0327463 A1* | 12/2009 | Saito | G06F 9/441 | 709/222 |
| 2011/0093691 A1* | 4/2011 | Galicia | G06F 9/4406 | 713/2 |
| 2011/0271088 A1* | 11/2011 | Princen | G06F 9/45533 | 713/2 |
| 2011/0312383 A1* | 12/2011 | Youn | G06F 9/441 | 455/558 |
| 2012/0005691 A1* | 1/2012 | Wong | G06F 9/541 | 719/319 |
| 2012/0260123 A1* | 10/2012 | Madampath | G06F 9/545 | 714/4.1 |
| 2012/0297177 A1* | 11/2012 | Ghosh | G06F 21/53 | 713/2 |
| 2012/0297180 A1* | 11/2012 | Teng | G06F 9/441 | 713/2 |
| 2013/0007842 A1* | 1/2013 | Park | G06F 21/74 | 726/3 |
| 2013/0031541 A1* | 1/2013 | Wilks | G06F 8/654 | 717/176 |
| 2014/0289864 A1* | 9/2014 | Dimitrakos | G06F 21/53 | 726/26 |
| 2015/0198999 A1* | 7/2015 | Liu | G06F 1/3234 | 713/323 |
| 2016/0004539 A1* | 1/2016 | Kawano | G06F 9/441 | 713/100 |
| 2016/0012233 A1* | 1/2016 | Kawano | G06F 21/575 | 713/165 |
| 2017/0046229 A1* | 2/2017 | Hsu | G06F 9/441 | |
| 2017/0061163 A1* | 3/2017 | Dasari | G06F 21/57 | |
| 2017/0140152 A1* | 5/2017 | Samsonov | G06F 21/575 | |
| 2018/0150637 A1* | 5/2018 | Filimon | G06F 21/575 | |
| 2018/0314832 A1* | 11/2018 | Nunami | G06F 9/441 | |
| 2019/0095357 A1* | 3/2019 | Ozsoy | G06F 12/1441 | |

\* cited by examiner

PROVIDING PRE-BOOT SERVICES IN AN INFORMATION HANDLING SYSTEM HAVING OPERATING SYSTEM-SPECIFIC HARDWARE AND/OR FIRMWARE COMPONENTS

CROSS-REFERENCE TO RELATED APPLICATIONS

This specification claims the benefit of the filing date of U.S. Provisional Patent Application No. 62/627,100, which is titled "PROVIDING PRE-BOOT SERVICES IN AN INFORMATION HANDLING SYSTEM HAVING OPERATING SYSTEM-SPECIFIC HARDWARE AND/OR FIRMWARE COMPONENTS" and was filed on Feb. 6, 2018, and of U.S. Provisional Patent Application No. 62/627,086, which is titled "SYSTEMS AND METHODS FOR MANUFACTURING INFORMATION HANDLING SYSTEMS WITH OPERATING SYSTEM-SPECIFIC HARDWARE AND/OR FIRMWARE COMPONENTS" and was filed on Feb. 6, 2018, the disclosure of which are hereby incorporated by reference herein in their entirety.

FIELD

The present disclosure generally relates to Information Handling Systems (IHSs), and, more particularly, to systems and methods for providing pre-boot services in an IHS having Operating System (OS)-specific hardware and/or firmware components.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and components may vary between different applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An Operating System (OS) is a piece of software that manages an IHS's hardware and software resources, and that provides common services for various programs and applications. Examples of OSs include, but are not limited to: MICROSOFT WINDOWS, OS X, LINUX, and CHROME OS.

Different OSs can have distinct hardware and/or firmware component requirements. For example, the hardware and/or firmware that controls the initialization or booting process of an IHS, depending upon the type of OS, can have varying levels of functionality, and does not be industry or specification-compliant. In fact, a "pre-OS" or "pre-boot" environment of a modern OS-specific initialization hardware and/or firmware can be designed to perform only the most basic booting routines until the OS itself boots (e.g., in a CHROME-based IHS, even video is not initialized by "Coreboot firmware").

The inventors hereof have recognized that, if an IHS must be initialized with reduced functionality (e.g., by "Coreboot firmware"), little can be done whenever an IHS hardware failure occurs, in terms of diagnostics, recovery, and serviceability. In most cases, costly whole unit service dispatches are the only option available, even when a single field-replaceable sub-component is causing a problem or failure.

SUMMARY

Embodiments of systems and methods for providing pre-boot services in an Information Handling System (IHS) having Operating System (OS)-specific hardware and/or firmware components are described. In an illustrative, non-limiting embodiment, an IHS may include an Embedded Controller (EC), a first Operating System (OS)-specific chip coupled to the EC, and a second OS-specific chip coupled to the EC, where the EC is configured to cause the IHS to: in a first mode of operation, perform a first boot procedure using the first OS-specific chip; and in a second mode of operation, perform a second boot procedure using the second OS-specific chip In some embodiments, the first and second OSs may be selected from the group consisting of: CHROME OS, and WINDOWS OS. The first OS-specific chip may be a first flash memory comprising first Basic Input/Output System (BIOS) instructions corresponding to the first boot procedure, and the second OS-specific chip may be a second flash memory comprising second BIOS instructions corresponding to the second boot procedure.

The IHS may be configured, at manufacturing, to operate under control of the first OS to the exclusion of the second OS. For example, the first OS-specific chip may be mounted on a user interface device coupled to the IHS, and the second OS-specific chip may be mounted on a motherboard of the IHS.

The EC may be further configured to, in response to the user interface device having been coupled to the IHS during manufacturing: (a) for the first mode of operation, set the first OS-specific chip active and set the second OS-specific chip inactive; and (b) for the second mode of operation, set the first OS-specific chip inactive and set the second OS-specific chip active.

The first mode of operation may take place under control of the first OS, and the second mode of operation may take place in a pre-OS recovery environment. The EC may be further configured to boot up the IHS in the first mode in the absence of a specific request by a user of the IHS to enter the pre-OS recovery environment. The EC may be further configured to isolate the first OS-specific chip from a chipset of the IHS in the pre-OS service environment. Moreover, the pre-OS recovery environment may include a diagnostic, recovery, or service tool that is absent from any service environment preceding the first OS in the first mode of operation.

In another illustrative, non-limiting embodiment, a method may implement one or more of the aforementioned operations. In yet another illustrative, non-limiting embodiment, a hardware memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 1A:
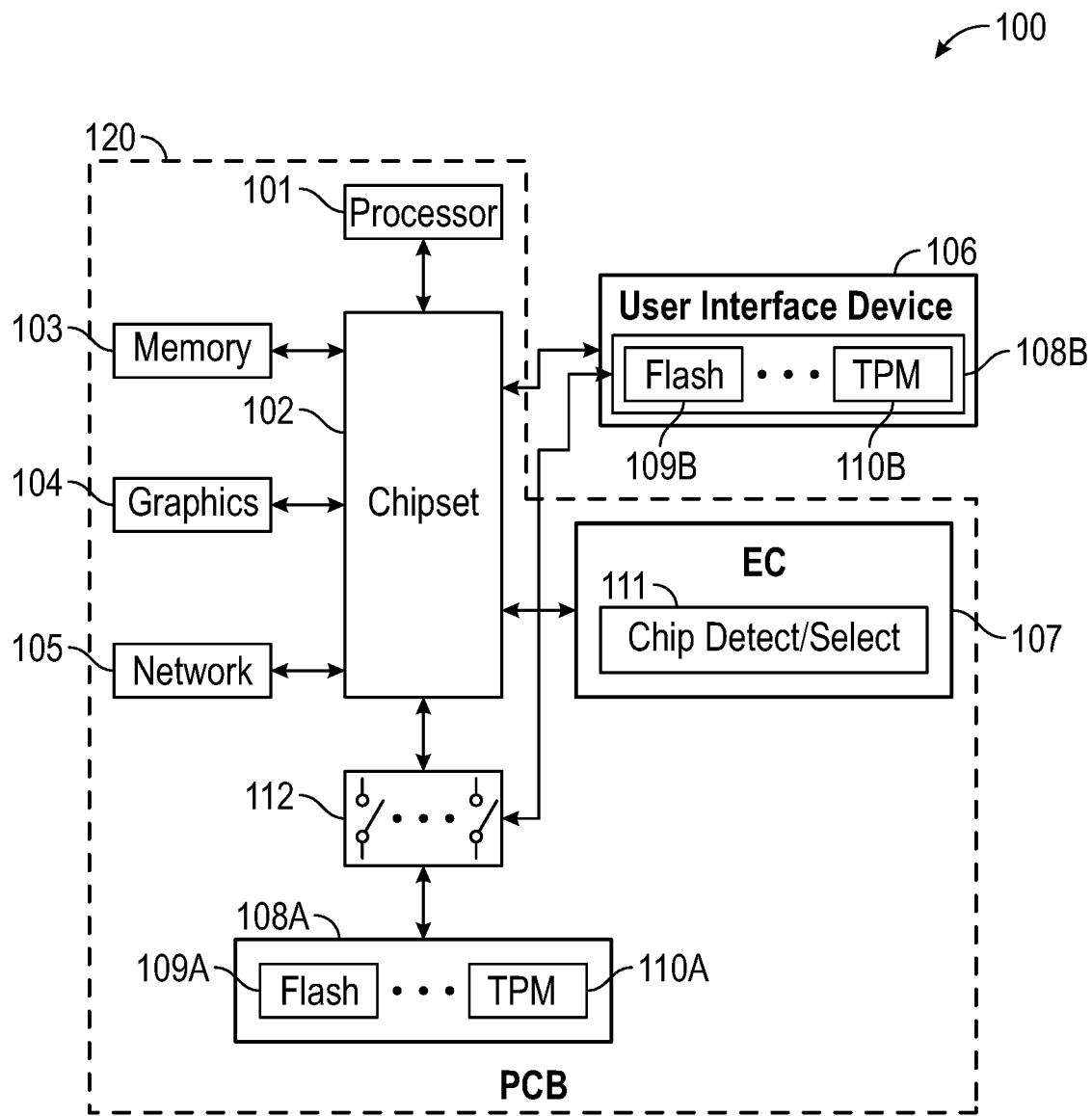
FIGS. 1A and 1B illustrate examples of components of an Information Handling System (IHS) according to some embodiments.

FIG. 1A illustrates an example of components of IHS 100, according to some embodiments. As shown, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102, which may comprise one or more integrated circuits (ICs) coupled to processor 101. In certain embodiments, chipset 102 may utilize a QuickPath Interconnect (QPI) bus to communicate with processor 101. Chipset 102 provides processor 101 with access to a variety of resources. For instance, chipset 102 provides access to memory 103. Memory 103 may be configured to store program instructions and/or data accessible by processor 101. In various embodiments, memory 103 may be implemented using any suitable memory technology, such as static RAM (SRAM), dynamic RAM (DRAM) or magnetic disks, or any nonvolatile/Flash-type memory, such as a solid state drive (SSD) or the like.

Chipset 102 may also provide access to graphics processor 104. In certain embodiments, graphics processor 104 may be part of one or more video or graphics cards installed as components of IHS 100. Graphics processor 104 may be coupled to the chipset 102 via a graphics bus such as provided by an AGP (Accelerated Graphics Port) bus or a PCIe (Peripheral Component Interconnect Express) bus. In certain embodiments, a graphics processor 104 generates display signals and provides them to a monitor or other display device.

Other resources may also be coupled to processor 101 through chipset 102. For instance, chipset 102 may be coupled to network interface 105, such as a Network Interface Controller (NIC). In certain embodiments, network interface 105 may be coupled to chipset 102 via a PCIe bus or the like. In various embodiments, network interface 105 may support communication via various wired and/or wireless networks.

Chipset 102 is also coupled to a set of one or more OS-specific hardware and/or firmware components 108A via chip select circuit 112 (e.g., a set of interconnected switches or multiplexers) under control of EC 107. In this example, OS-specific components 108A include flash chip 109A and Trusted Platform Module (TPM) chip 110A. For instance, OS-specific components 108A may be coupled to chipset 102 via a Serial Peripheral Interface (SPI) bus, Enhanced SPI (eSPI) bus, or the like.

Flash chip 109A may include non-volatile Basic Input/Output System (BIOS) or Unified Extensible Firmware Interface (UEFI) firmware used to perform hardware initialization during the booting process (power-on startup), and to provide runtime services for a respective OS; whereas TPM chip 110A may be a cryptoprocessor configured to securely store and/or process artifacts used to authenticate IHS 100 hardware, software, and/or users (e.g., via passwords, certificates, or encryption keys).

Embedded Controller (EC) 107 may be coupled to processor 101 via chipset 102 using SPI, eSPI, System Management Bus (SMBus), or shared interface techniques. Typically, EC 107 may be implemented as a microcontroller that handles tasks that the OS does not handle, such as receiving and processing signals from a keyboard, turning the IHS on and off, thermal measurement and response, controlling visual indicators, managing a battery, allowing remote diagnostics, service, and remediation, etc.

EC 107 may also have its own memory, wherein chip detect/select module 111 and/or program instructions may be installed and/or stored.

User interface device 106 may include a keyboard, trackpad, thumb drive, etc. In some embodiments, user interface device 106 may include a different set of OS-specific hardware and/or firmware components 108B, including flash chip 109B and TPM chip 110B, in addition to a device controller (e.g., a keyboard or trackpad controller).

In some cases, flash chip 109A and TMP chip 110A may be mounted on the same printed circuit board (PCB) 120 (e.g., a motherboard) as chipset 102 and/or processor 101 during a first manufacturing process. For example, for a particular IHS being manufactured for subsequent operation under control of a first OS (e.g., for a WINDOWS-based platform), components 108A that are specific to that first OS—that is, "first OS-specific" flash chip 109A and/or controller chip 110A—may be mounted onto PCB 120, by default.

During a subsequent manufacturing process, and in response to user interface device 106 having a second OS-specific flash chip 109B and/or controller 110B (e.g., for booting into a CHROME-based platform) being coupled to the IHS, chip detect/select module or program instructions 111 may cause EC 107 to deactivate first OS-specific chips 109A and/or 110A using chip select circuit 112.

Chip detect/select module or program instructions 111 may also cause EC 107 to activate second OS-specific chips 109B and/or 110B. For example, EC 107 may re-route traces of an SPI bus arriving at chip select circuit 112 to user interface device 106. EC 107 may also direct a boot sequence of IHS 100 to use second OS-specific chips 109B and/or 110B (instead of first OS-specific chips 108A), a different storage device, and/or a different storage partition.

Conventionally, when different OSs have different, potentially conflicting hardware and firmware component requirements, an IHS manufacturer must design two distinct motherboards to meet those components. In contrast, systems described herein provide a modular hardware architecture that allows for a common PCB or motherboard to be used for two or more OSs, particularly where some amount of hardware duplication of components on the motherboard (e.g., an unused OS-specific chip 109A and/or 110A) is acceptable or desirable.

Although second OS-specific chips 109B and/or 110B are shown as residing in user interface device 106, it should be noted that those chips may alternatively reside elsewhere (e.g., on a mezzanine card or the like). Moreover, although two sets of OS-specific chips 108A and 108B are described (one set for each conflicting OS hardware/firmware requirement), it should be noted that any number of OSs may be supported by placing additional, corresponding OS-specific chips on motherboard 120 and/or user interface device 106.

In some implementations, the systems and methods described herein may, in addition or as an alternative to hardware switching, also drive firmware overrides to enable new operations, or to remove default operations. For example, if a common EC 107 is used on motherboard 120, EC-to-OS Application Programming Interfaces (APIs) that are specific to a first OS may be restricted by EC 107 when booting to a second OS.

In various embodiments, IHS 100 may not include each of the components shown in FIG. 1A. Additionally or alternatively, IHS 100 may include components in addition to those that are shown in FIG. 1A (e.g., storage devices, Super I/O controllers, USB ports, etc.). Furthermore, some components that are represented as separate components in FIG. 1A may, in some embodiments, be integrated with other components. In various implementations, all or a portion of the functionality provided by the illustrated components may instead be provided by components integrated into processor 101 as a system-on-a-chip (SOC) or the like.

Figure 1B:
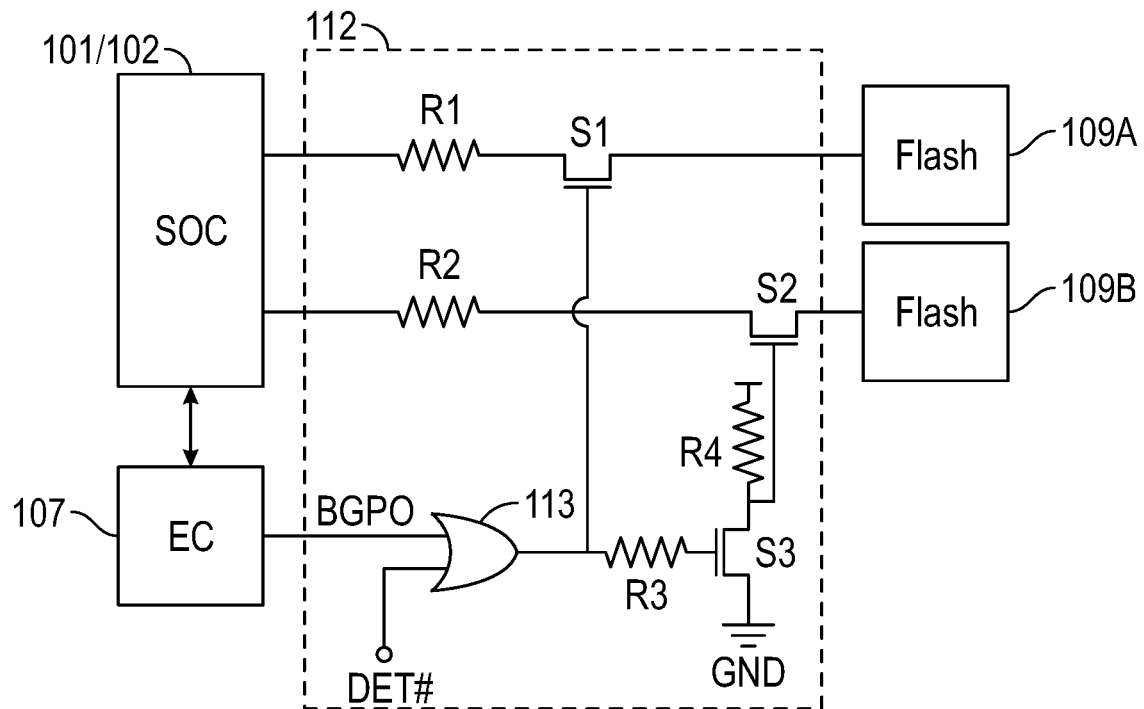

FIG. 1B illustrates additional components of IHS 100. As described above, here a monolithic SoC 101/102 is coupled to EC 107. Both components are coupled to first OS-specific flash 109A and to second OS-specific flash 109B via chip select circuit 112.

For example, first OS-specific flash 109A may include UEFI/EC firmware (typically created by the IHS manufacturer) and a management engine firmware (typically created by the SoC manufacturer), which are designed to boot a WINDOWS OS. Meanwhile, second OS-specific flash 109B may include custom firmware provided by a custom OS developer, which is designed to boot that custom OS only. In many cases, second OS-specific flash 109B may provide a limited or no pre-OS environment, until the custom OS itself boots. In contrast, first OS-specific flash 109A may provide a pre-OS diagnostics, recovery, and serviceability options.

Switching between: (a) the loading of instructions from first OS-specific flash 109A, and (b) the loading of instructions from second OS-specific flash 109B; enables the provisioning of pre-OS tools (first flash 109A) in an IHS that is otherwise natively configured with hardware and/or firmware (second flash 109B) that does not support those pre-OS tools, and without having to modify the contents of second OS-specific flash 109B. Dynamically enabling a service or recovery boot mode where EC 107 loads first flash 109A instead of second flash 109B for service purposes prior to any OS booting up, for example, renders it unnecessary to change the boot path of a IHS that has been manufactured to operate with the second or custom OS.

To enable dynamic switching, chip select circuit 112 may include a number of electronic components R1-R3, S1-S3, and logic gate(s) 113 coupled to each other as shown in FIG. 1B. In this non-limiting example, EC 107 can output an override signal BGPO that is combined with an indicator signal DET # via OR gate 113. Indicator signal DET # determines whether second OS-specific flash 109B is present, and/or whether keyboard 202 lacks key 203 (see FIG. 2 below).

The output of OR gate 113 is coupled to the gates of switches S1-S3, and therefore it controls whether first OS-specific flash 109A or second OS-specific flash 109B is coupled to SOC 101/102, and/or loaded into EC 107 and/or processor 101, at a given boot cycle:

TABLE I

| DET# | BGPO | Flash | State |
|---|---|---|---|
| 0 | 0 | Second flash 109B | Native |
| 0 | 1 | First flash 109A | Service |
| 1 | 0 | First flash 109A | Native |
| 1 | 1 | First flash 109A | Native |

For example, when key 203 is present in keyboard 202 at manufacturing, the value of DET # is at a logic 1, which means that the IHS has been configured for native operation under control of the first OS at the factory (e.g., WINDOWS). And, in this configuration, as can be seen in the bottom two rows of Table I, first flash 109A would be loaded by default, regardless of the state of override signal BGPO.

When key 203 is not present, however, the value of DET # is a logic 0, which means the IHS has been configured for native operation under control of a second or custom OS at the factory (e.g., CHROME). As shown in the top two rows of Table I, this allows a native or normal boot mode when BGPO is a logic 0 (second flash 109B is used to boot up the IHS), and it also allows a service or override mode when BGPO is a logic 1 (the contents of first flash 109B is used to boot up the IHS into a pre-OS service environment).

In some cases, the override or service mode may be reached in response to a selected combination of keys, which may be pressed upon powering or resetting IHS 100. For example, a recovery or service situation may be invoked as follows: when a user holds down a selected keyboard key ("Fn") and presses the power button on the IHS chassis to power up, EC 107 may flag the event as a custom power-up condition, and may inform UEFI firmware (e.g., flash 109A) of the request to load a diagnostic to directly run various tests (e.g., LCD, memory, fan, etc.) for detection of hardware errors.

EC 107 may override the default or native chip selected based upon keyboard detection (flash chip 109B), to dynamically select a different chip (flash chip 109A) containing more sophisticated and/or feature-rich firmware, for service and remediation purposes, than what would otherwise be available if the default chip had been selected in a native mode of operation (that is, in the absence of the user's initiation of a pre-OS service environment).

In some implementations, EC 107 may support a custom General Purpose Output (GPO) on the real-time clock (RTC) power well, which can latch a logic state across system reset cycles. This RTC GPO may be used to override the default chip selection logic using the populated keyboard signaling as the chip select control.

In a general case, depending upon on the type of keyboard 202 present (e.g., WINDOWS OS logo, CHROME OS logo, no logo, etc.), a DET # signal by default enables either flash part 109A (e.g., for a WINDOWS OS boot) or flash part 109B (e.g., for a CHROME OS boot). Then, EC 107, through a RTC-backed BGPO signal, can override the DET # signal to force the use of the other, non-default or non-native flash part, when operating in recovery mode.

In an IHS manufactured with WINDOWS installed, there is no need for EC 107 to override the DET # signal, because the IHS always boots from flash part 109A (part 109B may not be installed), and therefore a pre-OS recovery environment is available by default. In an IHS system natively configured with a CHROME keyboard, however, the default or native boot flash is part 109B, as selected by the DET # signal.

Figure 2:
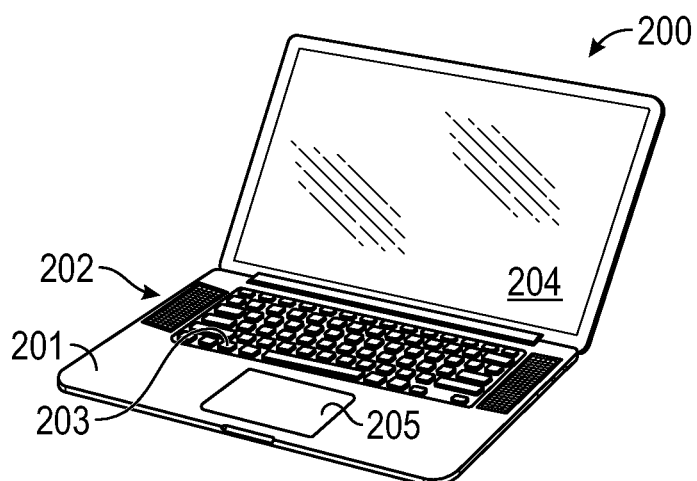
FIG. 2 illustrates an example of an IHS chassis according to some embodiments.

FIG. 2 illustrates an example of IHS chassis 200. In various embodiments, IHS chassis 200 may include one or more of the internal components described in FIG. 1. As shown, IHS chassis 200 includes base or bottom portion 201 fastened to lid or top portion 204. Top portion 204 may be coupled to base portion 201, such that top portion 204 may be moved or pivoted between a closed position and an open position with respect to base portion 201.

In some cases, top portion 204 may include a display or the like to present visual content such as a graphical user interface, still images, video, etc. using any appropriate technology such as a liquid crystal display (LCD), organic light-emitting diode (OLED), etc. Conversely, base portion 201 may accommodate user input devices such as keyboard 202 and touchpad 205. Touchpad 205 may be configured to receive finger gesturing or the like.

Keyboard 202 may include a plurality of keycap assemblies, each having an associated key. Each key may have a symbol imprinted thereon for identifying the key input associated with the particular key (e.g., QWERTY). In operation, keyboard 202 may be arranged to receive a discrete input at each keypad using a finger motion usually referred to as keystrokes. Keystrokes may be converted to electrical signals that are passed to a processing unit of IHS 100 (e.g. processor 101) for evaluation and/or control.

In various embodiments, selected key 203 may include an OS logo marked thereon (e.g., silkscreened, etched, etc.) that usually signifies the existence of a license agreement or business relationship between the IHS manufacturer and the OS developer. As such, the presence or absence of key 203 may be used by EC 107 to select, at manufacturing time, to decouple first OS-specific chips 108A from chipset 102 and/or to couple second OS-specific chips 108B to chipset 102 for operation of IHS 100.

For example, if key 203 has a first logo representing a first OS, EC 107 may select, at manufacturing, to maintain first OS-specific chips 108A coupled to chipset 102. Conversely, if key 203 has a second logo representing a second OS, or if it does not otherwise have an OS logo imprinted thereon, EC 107 may select, at manufacturing, to decouple first OS-specific chips 108A and couple second OS-specific chips 108B to chipset 102 instead.

In some implementations, key 203 may be removable from keyboard 202 and/or replaceable with another key having a different OS logo imprinted or marked thereon. Additionally, or alternatively, the pinout of a keyboard matrix of keyboard 202 may identify whether selected key 203 is present, the type of keyboard, and/or the type of OS-specific chips 108B included in keyboard 202. Additionally, or alternatively, IHS 100 may detect the presence of key 203 using a sensor coupled to keyboard 202 and/or the IHS chassis.

Figure 3:
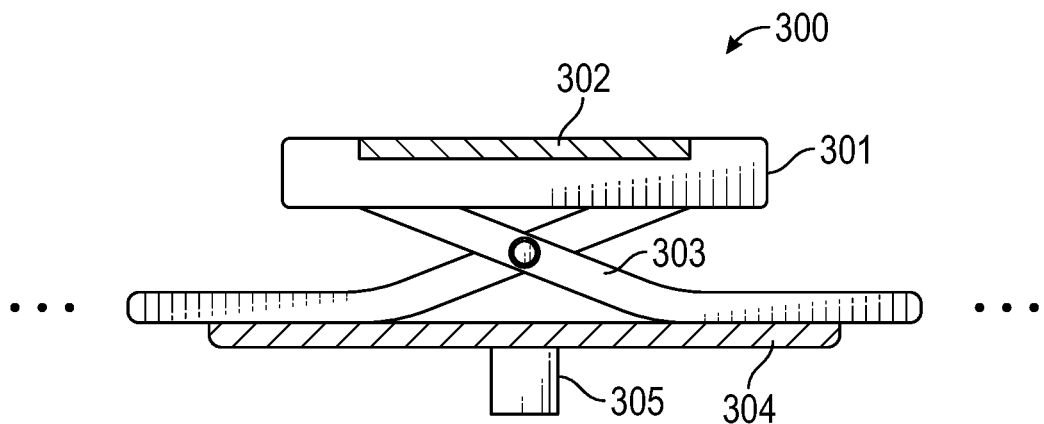
FIG. 3 illustrates an example of a keyboard detection system according to some embodiments.

To further illustrate this, FIG. 3 shows an example of keyboard detection system 300. In various embodiments, key 301 may include visual markings 302 (e.g., an OS logo). Key 301 may be coupled to electromechanical layer 303 having membranes, lever structures, metal plates, domes, and/or electronic circuits used for the operation of key 301 as an input device. Backlight module 304 is assembled underneath electromechanical layer 303.

Although omitted for sake of brevity, a person of ordinary skill in the art will recognize in light of this disclosure that electromechanical layer 303 may have a variety of structures for holding key 301 in place, to bias key 301 up or down, to detect keystrokes, etc. Moreover, backlight module 304 may include a number of internal components such as a masking layer, a light guide plate, a light bar, and a reflector layer.

In various embodiments, the presence or absence of key 301 may be detected using sensor 305. For example, sensor 305 may include an embedded magnet with a Hall Effect sensor. Additionally, or alternatively, sensor 305 may include a co-located rubber dome actuator that identifies a plunger coupled to the physical key. Additionally, or alternatively, sensor 305 may include a light sensor that determines an amount of light from backlight 304 that is absorbed or transmitted by markings 302 to distinguish whether markings 302 have a first or second OS logo (such that different visual markings 302 have different silkscreened or etched areas, and therefore different light absorption or transmission coefficients).

Accordingly, in various embodiments of the systems and methods described herein, strict hardware and firmware components that conflict between disparate OSs can be addressed during manufacturing of the IHS without having to design a separate motherboard for each OS. These systems and methods allow differences in the design to be bypassed on the main board and replaced with alternate components on a separate board, such as a mezzanine card or a user interface device (e.g., keyboard). The manufacturing bypass in turn enables an IHS having a motherboard that contains hardware and/or firmware specific to a given OS to be certified, by another OS developer, as having been designed to run the other developer's OS.

Figure 4:
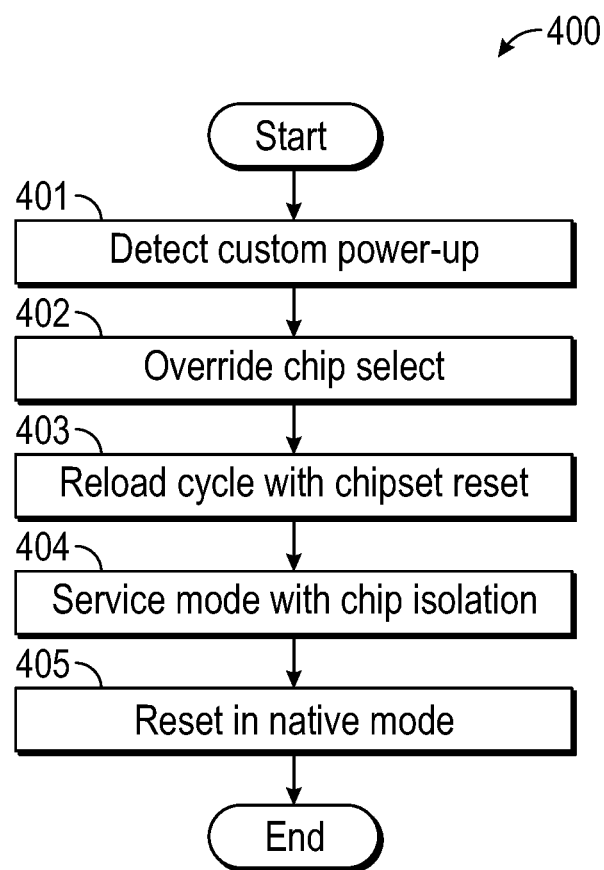
FIGS. 4 and 5 illustrate an example of a method for providing a pre-boot or pre-Operating System (OS) service environment according to some embodiments.
Figure 5:
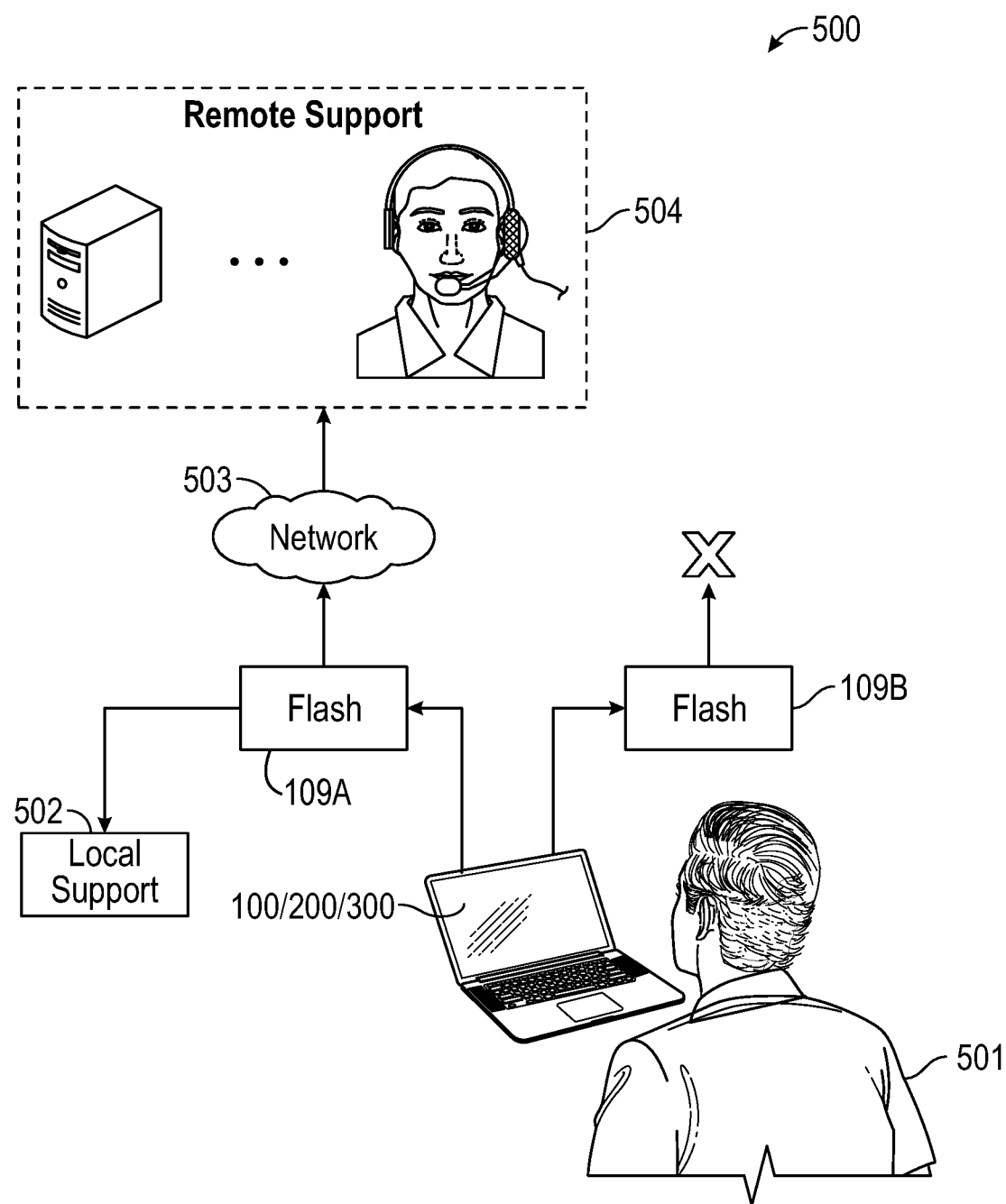

FIGS. 4 and 5 illustrate an example of a method for providing a pre-boot or pre-OS service environment. Method 400 may be used, for instance, in situations where IHS 100 has been manufactured to operate with a second or custom OS (e.g., CHROME), after effecting the aforementioned manufacturing bypass. In this scenario, during normal or native operation of IHS 100, EC 107 would ordinarily load the contents of second flash 109B. The contents of first flash 109A ordinarily go unused, because a corresponding "first OS" (e.g., WINDOWS) is not installed or available. However, in a recovery or service situation, method 400 may allow the contents of first flash 109A to be temporarily or occasionally loaded for support or remediation purposes (without booting either the first or second OSs), instead of loading the contents of second flash 109B, which may in turn be inaccessible to, isolated and/or protected from, other IHS components.

Again, by default, and unless user 501 affirmatively requests otherwise (e.g., by pressing the "Fn" key on a keyboard while pushing a power button on the IHS chassis), EC 107 starts a native boot process from flash 109B that results in the booting of a native OS (e.g., CHROME). In contrast, method 400 instantiates a pre-OS recovery environment 500 upon user's 501 request. Particularly, at block 401, EC 107 detects a custom power-up condition. For example, EC 107 may recognize an input combination (e.g., Fn key and power button). In response, at block 402, EC 107 may toggle the state of the BGPO signal to override the default or native chip select (that is, flash chip 109B) for the next EC boot cycle.

At block 403, EC 107 proceeds to reset chipset 102 in a clean fashion to avoid the side effects of a dirty shutdown. In most cases, because EC 107 will not have reached the x86 run rail power-up stage, at this point, the IHS is still in an S5 power state or the like. With chipset 102 held in reset, a manageability engine (ME) will stop running and no agents will be fetching from the SPI flash 109B. EC 107 may reset itself via a hardware watchdog timer or alternatively jump back to the boot vector in order to force an EC firmware re-load cycle.

At block 404, after the EC reset or jump to boot ROM, the BGPO signal is in the override state and the EC code fetch (along with BIOS boot) will be from first flash chip 109A. Once the EC fetch has completed and transferred control to EC firmware, EC 107 detects the keyboard type along with the state of the BGPO pin. When EC 107 detects BGPO overriding the DET # signal, it flags the BIOS during Power-On Self-Test (POST) that this is a service, support, or recovery mode boot.

In various implementations, the BGPO override signal can only force a chip select to flash chip 109A, and therefore flash chip 109B remains protected from EC 107 when the IHS boots or reboots, ensuring no physical tampering with flash chip 109B's image when the IHS is operating in recovery mode.

Still at block 404, the BIOS may check the EC flag for the service mode, in which case a pre-boot or pre-OS service and/or recovery environment 500 shown in FIG. 5 may be created that includes local and remote (over network 503) support, diagnostic, and/or recovery tools 502 and/or 504. After performing one or more support, diagnostic, and/or recovery operations, the BIOS may log and report the error(s) to user for appropriate action (e.g., QRCode, etc.), or take other corrective action. In some cases, if the EC flag is not set, yet IHS 100 has keyboard 203 present, the BIOS does not run diagnostics.

At block 405, after tests have completed, for example, the BIOS may send EC 107 a mailbox command, to restart in normal or native mode. EC 107 shuts down chipset 102 and in some cases unconditionally reconfigures the BGPO signal to "no override mode" before setting its watchdog timer for another EC reset (or jumping back to boot ROM vector). Upon EC reset, the chip select reverts back to its original setting: in this case, flash chip 109B. When EC 107 starts, it fetches code from flash chip 109B to start a boot process corresponding to the IHS's native OS (e.g., CHROME). In some embodiments, in case of AC removal while in override mode, EC 107 may restore the BGPO to non-override mode before power is completely lost.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   an Embedded Controller (EC);
   a first Operating System (OS)-specific chip coupled to the EC, wherein the first OS-specific chip comprises a first Trusted Platform Module and a first flash memory comprising first Basic Input/Output System (BIOS) instructions corresponding to a first boot procedure, and wherein the first OS-specific chip is mounted on a user interface device coupled to the IHS; and
   a second OS-specific chip coupled to the EC, wherein the second OS-specific chip comprises a second Trusted Platform Module and a second flash memory comprising second BIOS instructions corresponding to a second boot procedure, and wherein the second OS-specific chip is mounted on a motherboard of the IHS, and wherein the EC is configured to cause the IHS to:
      in a first mode of operation, perform the first boot procedure using the first OS-specific chip, wherein the first mode of operation is a primary mode of operation of the IHS; and
      in a second mode of operation, perform the second boot procedure using the second OS-specific chip, wherein the second mode of operation is a limited-purpose mode of operation of the IHS, and wherein during the second mode of operation, the first OS-specific chip is inaccessible.

2. The IHS of claim 1, wherein the IHS is configured, at manufacturing, to operate under control of the first OS to the exclusion of the second OS.

3. The IHS of claim 1, wherein the EC is further configured to, in response to the user interface device having been coupled to the IHS during manufacturing: for the first mode of operation, set the first OS-specific chip active and set the second OS-specific chip inactive.

4. The IHS of claim 3, wherein the EC is further configured to, in response to the user interface device having been coupled to the IHS during manufacturing: for the second mode of operation, set the first OS-specific chip inactive and set the second OS-specific chip active.

5. The IHS of claim 4, wherein the first mode of operation comprises operation of the first OS, and wherein the second mode of operation comprises a recovery environment.

6. The IHS of claim 5, wherein the EC is further configured to boot up the IHS in the first mode in the presence of a specific request by a user of the IHS to enter the recovery environment.

7. The IHS of claim 5, wherein the recovery environment includes a diagnostic, recovery, or service tool that is absent from the first mode of operation.

8. The IHS of claim 1, wherein the second mode of operation comprises a mode for operating a plurality of hardware components of the IHS.

9. In an Information Handling System (IHS) comprising:
an Embedded Controller (EC);
a first Operating System (OS)-specific chip coupled to the EC, wherein the first OS-specific chip comprises a first Trusted Platform Module and a first flash memory comprising first Basic Input/Output System (BIOS) instructions corresponding to a first boot procedure, and wherein the first OS-specific chip is mounted on a user interface device coupled to the IHS;
a second OS-specific chip coupled to the EC, wherein the second OS-specific chip comprises a second Trusted Platform Module and a second flash memory comprising second BIOS instructions corresponding to a second boot procedure, and wherein the second OS-specific chip is mounted on a motherboard of the IHS; and
a hardware memory device having program instructions stored thereon that, upon execution by the EC, cause the IHS to:
in a native mode of operation, perform the first boot procedure using the first OS-specific chip, wherein the native mode of operation is a primary mode of operation of the IHS; and
in a service mode of operation, perform the second boot procedure using the second OS-specific chip, wherein the service mode of operation is a limited-purpose mode of operation of the IHS, and wherein during the service mode of operation, the first OS-specific chip is inaccessible.

10. The hardware memory device of claim 9, wherein the IHS is configured, at manufacturing, to operate, in the native mode, under control of the first OS to the exclusion of the second OS.

11. The hardware memory device of claim 10, wherein the program instructions stored, upon execution by the EC, cause the IHS to: for the native mode, set the first OS-specific chip active and set the second OS-specific chip inactive.

12. The hardware memory device of claim 11, wherein the program instructions stored, upon execution by the EC, cause the IHS to: for the service mode, set the first OS-specific chip inactive and set the second OS-specific chip active.

13. The hardware memory device of claim 9, wherein the service mode of operation comprises a mode for operating a plurality of hardware components of the IHS.

14. In an Information Handling System (IHS) comprising an Embedded Controller (EC), a first Operating System (OS)-specific chip coupled to the EC, wherein the first OS-specific chip comprises a first Trusted Platform Module and a first flash memory comprising first Basic Input/Output System (BIOS) instructions corresponding to a first boot procedure, and wherein the first OS-specific chip is mounted on a user interface device coupled to the IHS, and a second OS-specific chip coupled to the EC, wherein the second OS-specific chip comprises a second Trusted Platform Module and a second flash memory comprising second BIOS instructions corresponding to a second boot procedure, and wherein the second OS-specific chip is mounted on a motherboard of the IHS; a method comprising:
in a native mode, performing the first boot procedure using the first OS-specific chip, wherein the native mode is a primary mode of operation of the IHS; and
in a recovery mode, performing the second boot procedure using the second OS-specific chip, wherein the recovery mode of operation is a limited-purpose mode of operation of the IHS, and wherein during the recovery mode of operation, the first OS-specific chip is inaccessible.

15. The method of claim 14, wherein the IHS is configured, at manufacturing, to operate, in the native mode, under control of the first OS to the exclusion of the second OS.

16. The method of claim 15, further comprising, in the native mode, setting the first OS-specific chip active and setting the second OS-specific chip inactive.

17. The method of claim 16, further comprising, in the recovery mode, setting the first OS-specific chip inactive and setting the second OS-specific chip active.

18. The method of claim 14, the recovery mode of operation comprises a mode for operating a plurality of hardware components of the IHS.

\* \* \* \* \*